United States Patent [19]

Bosserman et al.

[11] 4,031,552

[45] June 21, 1977

[54] MINIATURE FLAT PANEL PHOTOCATHODE AND MICROCHANNEL PLATE PICTURE ELEMENT ARRAY IMAGE INTENSIFIER TUBE

[75] Inventors: David A. Bosserman, Alexandria; Charles F. Freeman, Springfield, both of Va.

[73] Assignee: The United States of America as represented by the Secretary of the Army, Washington, D.C.

[22] Filed: Mar. 5, 1976

[21] Appl. No.: 664,325

[52] U.S. Cl. .................... 358/241; 313/105 CM; 340/324 M; 358/230

[51] Int. Cl.² .................... H04N 5/70; H04N 5/66

[58] Field of Search .................... 178/7.3 D, 6.8; 340/324 M; 313/105 CM; 358/241, 230

[56] References Cited

UNITED STATES PATENTS

| | | | |
|---|---|---|---|
| 3,745,554 | 7/1973 | Grant | 340/324 M |
| 3,812,486 | 5/1974 | Purchase | 340/324 M |
| 3,825,922 | 7/1974 | Ralph | 340/324 M |
| 3,885,180 | 5/1975 | Carts | 313/105 CM |
| 3,922,577 | 11/1975 | Orthuber | 313/105 CM |
| 3,979,636 | 9/1976 | Gunther | 313/409 |

*Primary Examiner*—Howard W. Britton
*Attorney, Agent, or Firm*—Nathan Edelberg; Max L. Harwell; Robert P. Gibson

[57] ABSTRACT

A miniature flat panel image intensifier display tube having an array of electrically isolated parallel photocathode array stripes adjacent and orthogonal to a microchannel plate input electrode array comprising electrically isolated parallel metallic stripes. A video picture signal generator modulates a radiation source that causes a generally uniform flow of photons to impinge on the photocathode array. The photoelectrons that are emitted from the photocathode array are selectively accelerated into a charge pattern according to differential voltages scanned across both arrays by array switching electronic means wherein the charge pattern is converted to a visible image for viewing by an observer.

4 Claims, 3 Drawing Figures

MINIATURE FLAT PANEL PHOTOCATHODE AND MICROCHANNEL PLATE PICTURE ELEMENT ARRAY IMAGE INTENSIFIER TUBE

The invention described herein may be manufactured, used, and licensed by or for the Government for governmental purposes without the payment of any royalty thereon.

BACKGROUND OF THE INVENTION

The present invention is in the field of night viewing devices, and especially in the field of miniature flat panel image intensifier display devices that have information carrying video signal inputs thereto that may be viewed by an observer when the display device is head mounted.

This invention is an improvement over the heavier head mounted cathode ray tube intensifiers that have previously been head mounted but have restricted the desired field-of-view and whose component weight takes up more of the soldier's total head mounted weight than desired.

SUMMARY

The present invention comprises a miniature flat panel display tube having an array of electrically isolated parallel photocathode stripes mounted on the inside of a transparent input faceplate and a microchannel plate (MCP) electron multiplier having an array of electrically isolated parallel metallic stripes as an input electrode with the conventional continuous metallic output electrode. The MCP array and photocathode array are orthogonal to each other and are in proximity focus when proper differential bias voltages switched by array switching electronic means are connected to interfacing array stripes.

A suitable picture signal generator that generates video type amplitude or brightness signals, such as a television type signal, modulates a radiation source positioned on the front of the transparent input faceplate wherein the radiation source uniformly illuminates the photocathode array. Photoelectrons are emitted from the photocathode array in an electronic charge pattern according to differential bias voltages applied to both the photocathode and MCP arrays by an array switching electronic means that determines the scan mode used in applying the bias voltages. The MCP multiplies the electronic charge pattern in the well known manner wherein the electron charge pattern from the MCP strikes a metallized phosphor on a transparent output faceplate for direct viewing by an observer.

DETAILED DESCRIPTION OF THE PREFERRED EMBODIMENT

Figure 1:
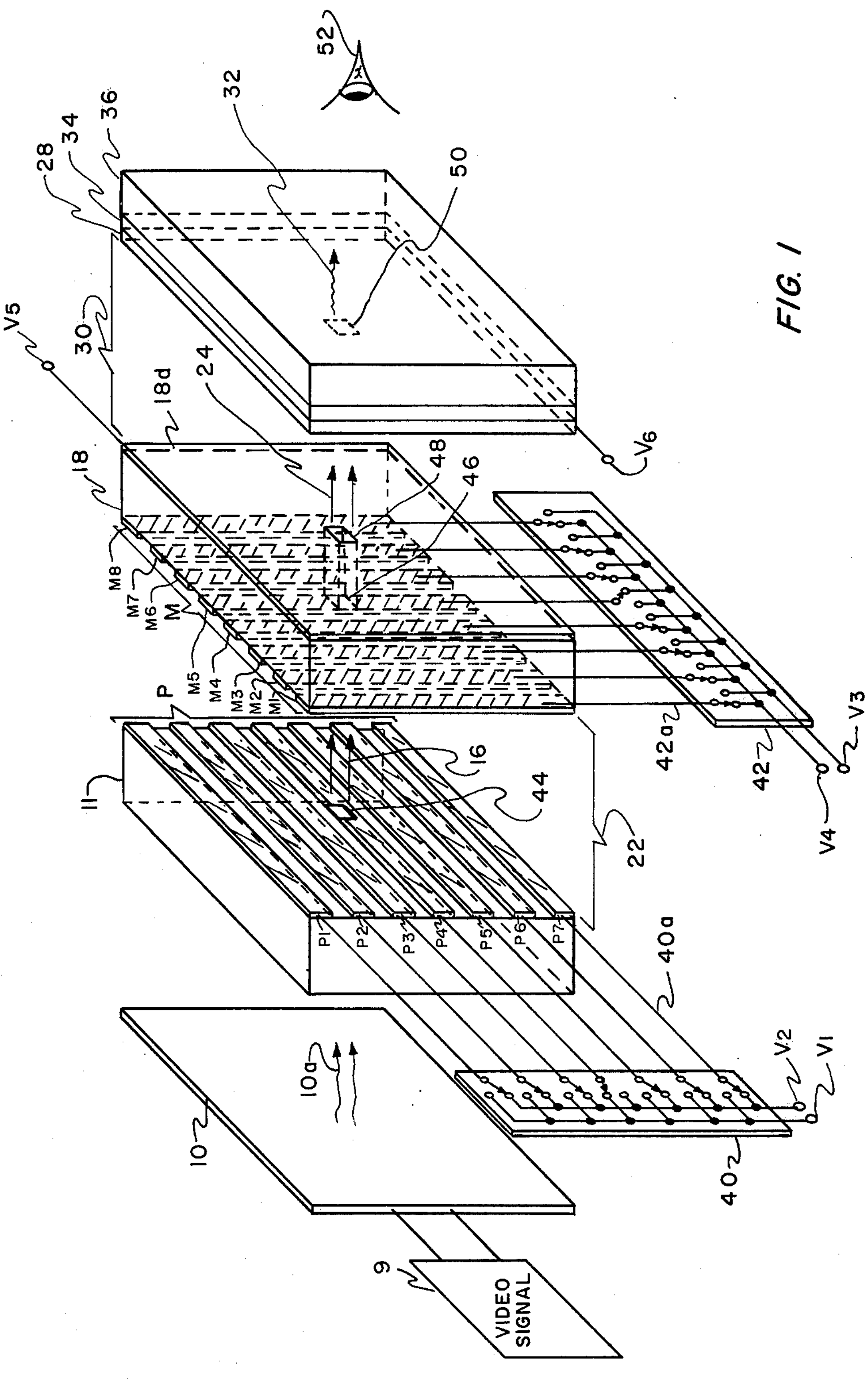
FIG. 1 is a schematic of the miniature flat panel image intensifier tube and shows the addressable mosaic arrays.

FIG. 1 shows the basic embodiment of the miniature flat panel image intensifier display tube in a diagrammatic side view perspective without showing the enclosure structure that holds a vacuum. The addressable mosaic array only shows a 7 × 8 picture element (or pixel) array in FIG. 1 for reasons of simplicity and clarity. However, a typical embodiment may have about 360 × 480 pixels, representing respectively the photocathode array stripes and the MCP array stripes. Binary voltages are shown as being the voltages available for switching by photocathode array switching means 40 and MCP array switching means 42. One stripe of each array is shown as having the proper differential voltages applied thereto for providing an electronic charge pattern between photocathode array P and MCP array M. These stripes are photocathode stripe P4 connected to voltage V1 and MCP stripe M5 connected to voltage V3. All the other stripes of both the P and M arrays are connected to voltages V2 and V4 respectively.

Various pixels and various combination of pixels may be addressed at a desired scan rate in order to carry out various scan and address schemes. One address scheme is that of switching on the "on" bias voltages V1 or V3 on one of their respective array stripes along connecting leads 40*a* or 42*a* while the other "on" voltage is swept across all of the other array stripes. As an example, assume that at the instant that P4 and M5 are active, or have the "on" voltage applied thereto, that voltage V1 remains applied to P4 until all the MCP array stripes M1 through M8 are swept by voltage V3, or conversely stripe M5 has voltage V3 applied thereto until all of the photocathode array stripes P1 through P7 are swept by voltage V1. Many other scanning schemes may be used such as, scanning by groups of array stripes, sequential scanning, interlace sequential scanning, etc.

Since the definition of a pixel is the interfacing, or cross-over areas, between the photocathode array stripes P1 through P7 and the MCP array stripes M1 through M8, when P4 and M5 are activated the photocathode array pixel 44, the interfacing MCP array pixel 46 the MCP output pixel 48, and the phosphor pixel 50 taken all together form one visible picture element or pixel. All of the other cross-over areas have voltages V2 and V4, or the "off" voltage, applied thereacross that represses photoelectron flow from the photocathode array P. Typical value of bias voltages V1 through V4 are as follows: V1 is at ground potential; V3 is +10 d.c. volts; V2 is +10 d.c. volts; and V4 is at ground potential. In other words, the "on" voltages V1 and V3 are a positive 10 d.c. volts that provide accelerating voltages for the photoelectrons 16 while the "off" voltages V2 and V4 present a repressive voltage of negative 10 d.c. volts to the photoelectrons. These voltages are appropriate for a proximity focus spacing 22 of 0.0002 inches between the two arrays. A typical switching rate for 40 and 42 is at 5 MHz.

Figure 2:
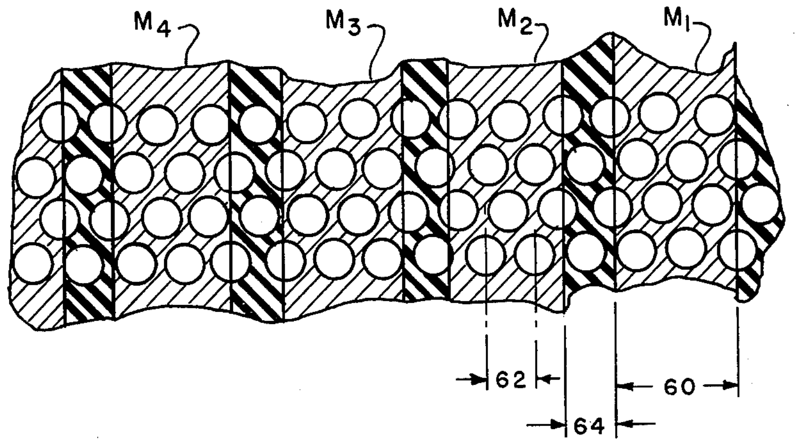
FIG. 2 shows the geometry of a typical microchannel plate input electrode array of this invention.

FIG. 2 is included to show typical dimensions of the MCP 18 input electrode array. Numeral 60 represents the width of one of the MCP input electrode stripes, represented by M1, which is typically 1.4 mils. The distance 64 between stripes, represented here by stripes M1 and M2, is typically 0.6 mil. The distance between adjacent channels of MCP 18 is represented by numeral 62 on a center-of-channel to center-of-channel basis and is typically 0.6 mil.

Figure 3:
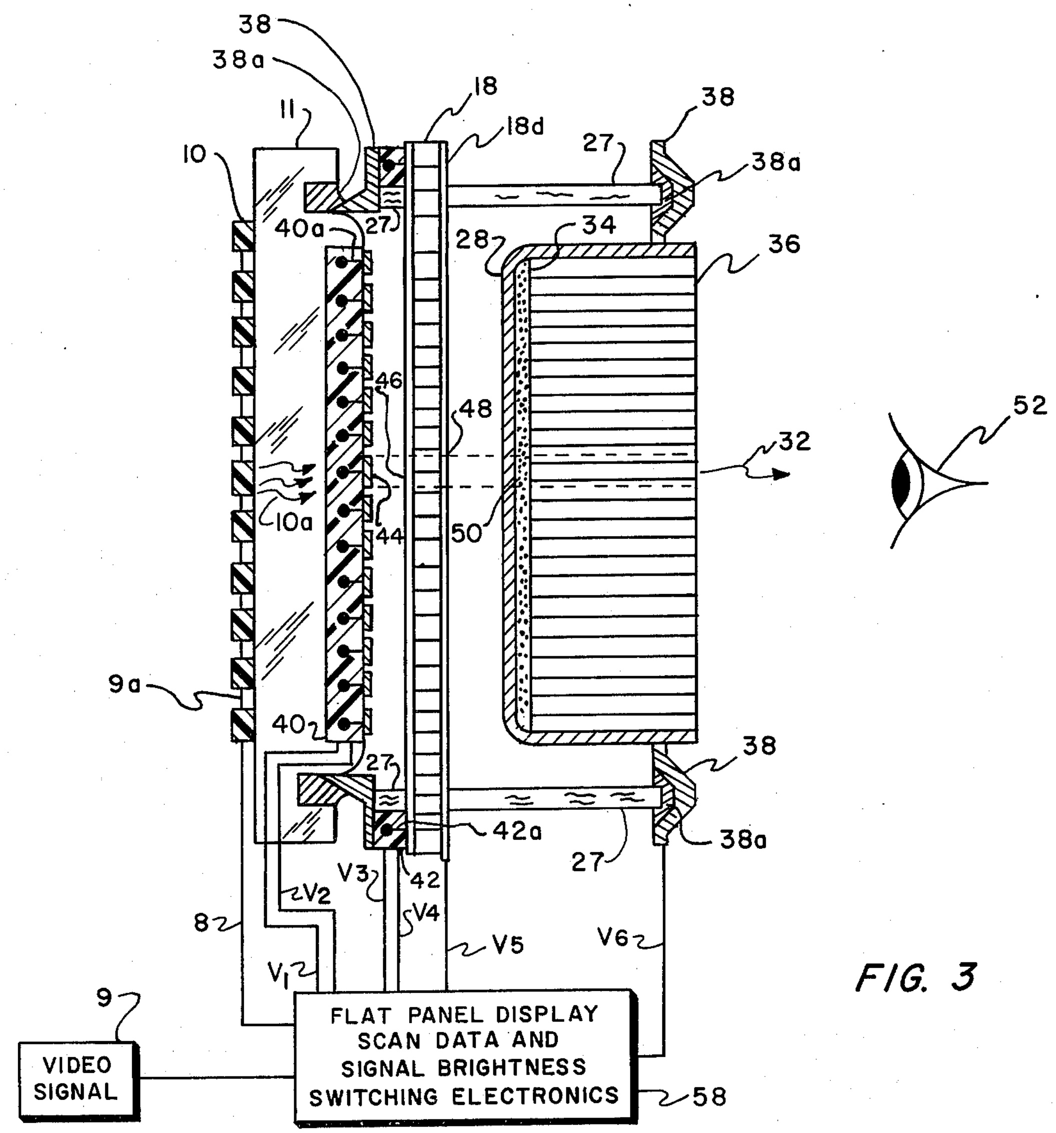
FIG. 3 shows a side view of the display tube.

Looking now at FIG. 3 along with FIG. 1, the input means of the miniature flat panel image intensifier tube comprises a video picture signal generator 9, such as a television type video signal or computer input amplitude or brightness signal, which signal is used to modulate a suitable radiation source 10 on the front of an input faceplate 11. Source 10 may be a light emitting diode (LED) array with the LEDs electrically connected together by leads 9*a* to provide a uniform flow of photons therefrom. The modulated radiation, or stream of photons 10*a*, which are emitted from source 10, uniformly illuminate photocathode array P. The photcathode array P is mounted on the inside of faceplate 11, which faceplate may be made of a transparent material such as glass or fiber optic. The photocathode array stripes P1 through P7 may be made of cesiated antimonide, such as S1 or S20 cathode material.

The modulated radiation 10*a* that is incident upon the photocathode array P generates photoelectrons therefrom in accordance with the signal from the video picture signal generator. Also, as stated above, the charge pattern through the proximity focus space 22 is in accordance with the bias voltages switched by 40 and 42 onto individual stripes P1 through P7 and M1 through M8. The multiplied electrons 24 that exit MCP 18 at the active MCP output pixel 48 travel through the MCP and phosphor proximity focus space 30 to strike phosphor layer 34 at the active phosphor pixel 50. The electrons pass through a very thin metallized phosphor electrode 28. The phosphor layer 34 is contiguous with a transparent output faceplate 36, which may be made of glass or fiber optic. Visible image 32 may be directly observed by the human eye 52.

A bias voltage V5 is connected to a continuous output electrode 18*d* of MCP 18 and bias voltage V6 is connected to the metallized phosphor electrode 28 to produce a constant electric field in proximity focus space 30. The voltage difference between V5 and V6 may be about 50 kilo-volts with the value depending on the distance across space 30. Space 30 may be arranged to permit the individual "on" pixels to spread until they overlap on the phosphor layer 34 to avoid the mosaic pattern effect.

The miniature flat panel image intensifier tube is shown in its vacuum environment in FIG. 3. The vacuum enclosure is formed by connecting collars 27 embutting MCP 18 and annular flanges 38. Collars 27 are electrical insulators, such as glass, quartz, or ceramic. Flanges 38 may be made of any good conductor material and are connected to collars 27, to the input faceplate 11, and to electrode 28 on the output faceplate 36 by indium seals or welded seal 38*a*. If MCP 18 and collars 27 are both made of glass, they may easily be fused together.

The array switching electronic means 58, the photocathode and MCP array switching means 40 and 42, the picture signal generator 9, and radiation source 10 are preferably outside the vacuum environment. The picture signal generator 9 may be a television camera or computer whose output is applied to array switching electronic means 58. Electronic means 58 modulates radiation source 10 with the pixel brightness from signal 9 and also controls photocathode array and MCP array switching circuits 40 and 42 with a scan signal input thereto. Circuits 40 and 42 may be solid state shift registers or a charge coupled device on one chip. Circuits 40 and 42 that directly control the pixel array may conveniently be tailored to the requirement of the picture signal generator 9, such as matching the video raster.

It should be understood that the foregoing disclosure relates to only a preferred embodiement of the invention and that numerous modifications or alterations may be made therein without departing from the spirit and the scope of the invention as set forth in the appended claims.

We claim:

1. A miniature flat panel picture element array image intensifier tube comprising:

- a video picture signal generator for providing a video signal;
- a radiation source, said radiation source being modulated by said video signal for creating a generally uniform flow of photons therefrom with said radiation source mounted on the front of a transparent input faceplate;
- a plurality of electrically isolated parallel photocathode array stripes mounted on the inside of said input faceplate;
- a microchannel plate electron multiplier having an array of electrically isolated parallel input electrode metallic stripes that are positioned adjacent said photocathode array stripes and are orthogonal thereto, said microchannel plate having a continuous metallic output electrode;
- an array switching electronic means for switching bias voltages in some selected scan mode over individual stripes of said photocathode array and over said array of microchannel plate input electrode metallic stripes for selectively providing proximity focus areas between cross-over stripes that have on bias voltages applied thereto and wherein repressive voltages exist on all other cross-over stripes that have off bias voltages applied thereto wherein photoelectrons emitted from said photocathode array stripes conform to a charge pattern swept through the proximity focus areas according to said scan mode; and
- a metallized phosphor screen mounted on the inside of a transparent output faceplate wherein said metallized phosphor screen is adjacent said microchannel plate output electrode for converting electrons from said microchannel plate into visible energy on said metallized phosphor screen for producing a visible image of said video signal according to said scan mode.

2. An image intensifier tube as set forth in claim 1 wherein said radiation source is a plurality of light emitting diodes electrically connected together.

3. An image intensifier tube as set forth in claim 2 wherein said array switching electronic means is solid state circuitry that controls a solid state photocathode array switching means and a solid state microchannel plate array switching means that sequentially switch in said scan mode said bias voltages on all cross-over pixels between said photocathodes array stripes and said array of input electrode metallic stripes on the microchannel plate.

4. An image intensifier tube as set forth in claim 3 wherein said solid state circuitry comprises a charge coupled device having an input thereto from said video signal and five outputs therefrom wherein a first output controls the brightness level of said radiation source according to the brightness level of said video signal and second and third outputs provide bias voltages to said microchannel plate output electrode and said metallized screen with said fourth and fifth outputs controlling said solid state photocathode array switching means and said solid state microchannel plate array switching means and the bias voltages provided thereto for selectively switching on said photocathode array stripes and said microchannel input electrode metallic stripes.

* * * * *